April 22, 1924.
P. GERLACH ET AL
1,491,300
SHEAF CARRYING ATTACHMENT FOR GRAIN HARVESTERS
Filed May 9, 1922
2 Sheets-Sheet 1
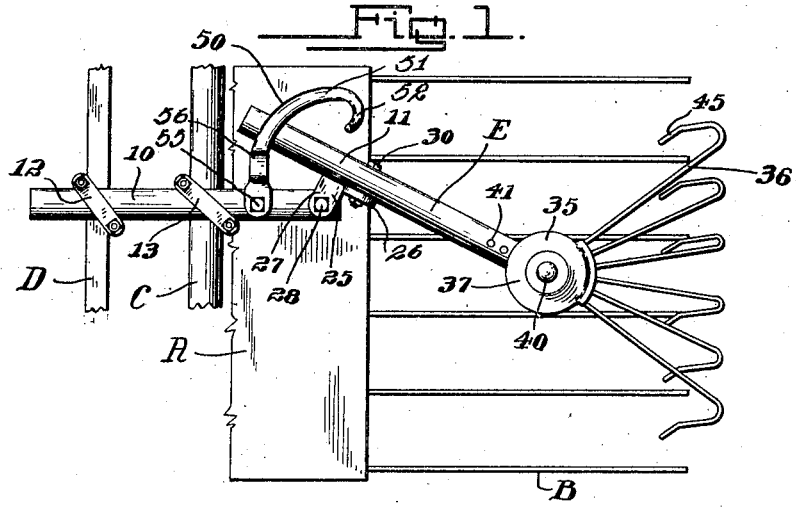
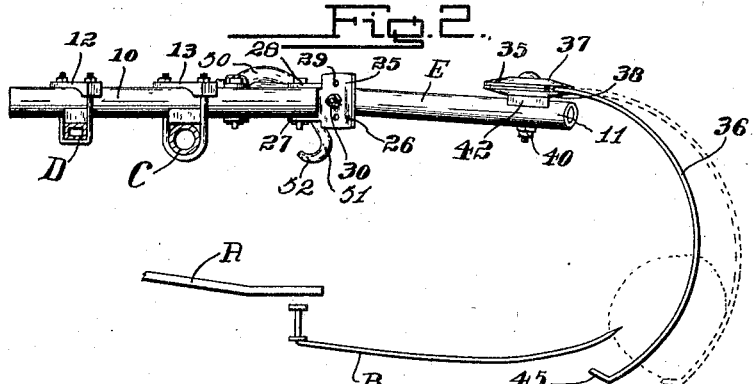
Inventors
Paul Gerlach.
Thomas Cuff.
Attorneys April 22, 1924.
P. GERLACH ET AL
1,491,300
SHEAF CARRYING ATTACHMENT FOR GRAIN HARVESTERS
Filed May 9, 1922 2 Sheets-Sheet 2
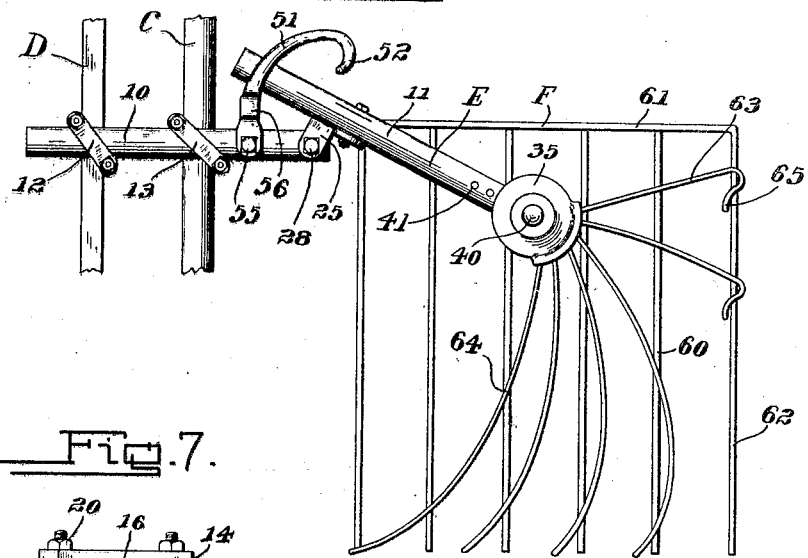
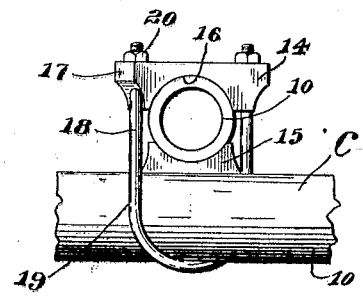
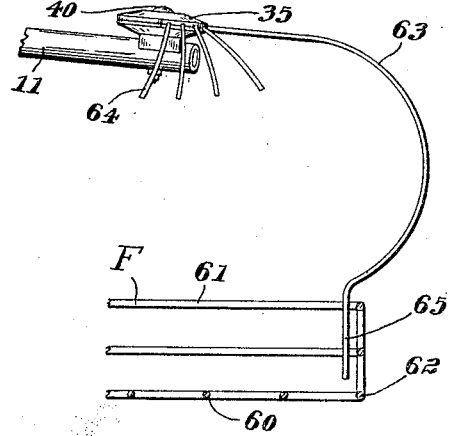
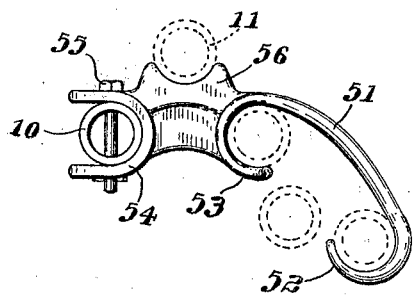
Inventors
Paul Gerlach.
Thomas Cuff.
Attorneys Patented Apr. 22, 1924.

1,491,300

UNITED STATES PATENT OFFICE.

PAUL GERLACH AND THOMAS CUFF, OF SASKATOON, SASKATCHEWAN, CANADA.

SHEAF-CARRYING ATTACHMENT FOR GRAIN HARVESTERS.

Application filed May 9, 1922. Serial No. 559,520.

*To all whom it may concern:*

Be it known that we, PAUL GERLACH and THOMAS CUFF, subjects of the King of Great Britain, residing at Saskatoon, in the Province of Saskatchewan and Dominion of Canada, have invented certain new and useful Improvements in Sheaf-Carrying Attachments for Grain Harvesters, of which the following is a specification.

This invention relates to harvesting attachments, and is an improvement on the pending application of Paul Gerlach for bundle carrying attachments for grain harvesters, filed Oct. 27, 1920, Serial No. 420,026, and the primary object of the present invention is to provide an improved bundle carrying attachment for grain harvesters formed wholly of metal, which is so constructed, that the same can be readily adjusted to suit varying conditions and different machines, and which will be strong and durable in use, and practically indestructible.

A further object of the invention is to provide a novel means for connecting the outer arm to the inner arm, and a novel means for normally holding the outer arm in its operative position in relation to the deck of the binder, said means permitting the arm to be readily swung to a rearward position when hitting an obstruction, and forming means for permitting the arm to be automatically returned to its normal position by its own weight.

A further object of the invention is to provide an improved means for holding the supporting arm in its normal position and for holding the supporting arm in its inoperative position when the same is swung over the harvester during the moving of the harvester to and from a field.

A further object of the invention is to provide a novel head for connecting resilient fingers or supporting rods of the attachment to the supporting bar or arm, said head forming means for permitting the convenient adjustment of the fingers and for preventing the accidental displacement or turning of the fingers in relation to the attachment.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a top plan view of the improved attachment, showing the same applied to a portion of a binder.

Figure 2 is a side elevation of the improved attachment, showing its relation to the coacting parts of the binder.

Figure 3 is a top plan view of the lower portion of the head utilized for connecting the resilient fingers or rods in position.

Figure 4 is a fragmentary diametric section through the head and a portion of the supporting arm therefor, illustrating the novel formation of the head for supporting the resilient fingers or guards.

Figure 5 is a detail section through a portion of the attachment illustrating the means of pivotally connecting the attaching and the supporting arms together.

Figure 6 is a detail end view of the attaching arm and the improved casting carried thereby utilized for holding the supporting arm in its normal operative position, and in its inoperative position.

Figure 7 is an enlarged fragmentary side elevation of a portion of the attachment illustrating the novel form of clamp utilized for connecting the attachment to one of the stationary portions of a binder.

Figure 8 is a top plan view of a modified type of the attachment, showing the same connected with a portion of the binder in which the carrier structure projects laterally therefrom.

Figure 9 is a detail fragmentary side elevation of a modified form of the device, showing the same connected with a portion of the binder with which the carrier structure therefor projects laterally therefrom, the carrier structure being shown in cross section.

Referring to the drawings in detail, wherein similar reference characters designate corresponding parts throughout the several views, the letter A indicates a deck of an ordinary binding grain harvester, from which deck, the bundles of grain are deposited upon the ordinary carrier structure B. The knotter supporting casing or bar of the binder is indicated by the letter C, while D indicates the rear brace of the knotter mechanism.

The improved attachment is generally indicated by the letter E and comprises an attaching bar 10, and a supporting bar 11. These bars 10 and 11 are preferably, but not necessarily constructed of iron pipe, and as shown each of these bars are of hollow tubular form. The attaching bar 10 is connected to the knotter casing or bar C, and to the rear brace D of the knotter mechanism, by means of suitable clamps 12 and 13. These clamps 12 and 13 can be of any desired form or construction, but it is preferred that the same be constructed in accordance with the form of clamp shown in Figure 7 of the drawings.

The clamp shown in Figure 7 of the drawings include an upper and lower casting 14 and 15, the inner faces of which are rounded to form seats 16 for engaging the tubular hollow body of the attaching rod 10. The upper casting 14 is provided with outwardly extending ears 17, which are adapted to slidably receive the legs 18, of the U-bolts 19, which extend around the knotter casing or bar C and the rear face bar of the knotter mechanism. The upper ends of the arms of the U-bolt 19 are threaded for the reception of nuts 20, which engage the upper casting. This clip or clamp holds the bar C rigidly in position and permits the bar to be freely turned upon loosening of the nuts 20, in order to facilitate adjusting of the outer supporting bar 11, when found necessary or desirable. It can be seen that a slight turn of the attaching bar 10 will raise or lower the outer end of the supporting bar 11.

The supporting bar 11 is connected to the outer end of the attaching bar 10, by means of a novel casting 25. This casting 25 includes a flat base plate 26, and a pair of laterally projecting pivot ears 27, which engage the upper and lower surfaces of the attaching bar 10. These pivot ears 27 are provided with suitable openings, which align with an opening formed in the outer end of the attaching bar 10. These aligned openings receive a suitable pivot bolt or the like 28. This permits the free turning of the casting 25 in a horizontal plane. The base plate 26 is provided with a plurality of openings 29, any one of which is adapted to receive the pivot and supporting bolt 30, which is utilized for connecting the supporting bar 11 to the casting. The bolt 30 extends entirely through the supporting bar 11, and if so desired a plurality of openings may be provided in the supporting bar, so that the outer end thereof can be adjusted toward and away from the deck of the binder, which may be desirable in some instances. It can be readily seen that the bar 11 can be readily raised or lowered by removing the bolt 30 and placing the bolt in either the upper or lower holes formed in the base plate 26. It also can be seen that the casting 25 not only permits an adjustment between the supporting bar 11 and the attaching bar 10, but also permits the supporting bar 11 to be swung in a vertical and horizontal plane.

The outer end of the supporting bar 11 carries the head 35 for the bundle fingers or rods 36. The head 35 includes upper and lower castings 37 and 38, through which the inner ends of the bundle engaging fingers or rods 36 are confined. The castings 37 and 38 are of substantially disc formation and are provided with axially aligned openings 39, for the reception of a pivot bolt 40, which extends through any one of a plurality of openings 41, formed in the outer end of the supporting arm or bar 11. It can be seen that the pivot bolt 40 permits the head be readily turned thereon, and since this bolt can be positioned in any one of the openings 41 it also permits the head to be mounted at a desired distance from the binder deck. A suitable spacing block 42 of novel construction may be interposed between the head 35 and the supporting bar or arm 11. As shown, this spacing block conforms to the configuration of the supporting arm or bar 11. The resilient bundle engaging fingers or rods 36 are arranged in pairs, that is, the inner ends thereof are connected by bight portions 43. The meeting faces of the castings 37 and 38 are provided with semi-circular grooves 44 for the reception of the inner ends of the rods or fingers. This construction prevents the sliding of the fingers within the head and also prevents the withdrawing of the fingers from the head. The rods or resilient fingers 36 curve outwardly and downwardly toward the platform B, and have their lower ends bent slightly upwardly as indicated by the numeral 45. The rods are curved upwardly to form a rest for a sheaf or loose straw, when the sheaf or straw is forced into the pocket formed by the rods or fingers, as shown in dotted lines in Figure 2 of the drawings. The rods are curved rearwardly to prevent the sheaves or straw from adhering to the rods, which would otherwise cause it to be dragged along, when the sheaves are dumped.

The lower ends of the rods or fingers 36 extend slightly below the platform B of the harvester, and are curved outwardly from the outer ends of the rods of the platform or carrier B of the harvester as clearly shown.

The attaching bar 10 inwardly of the casting 25 is provided with a novel form of support for the supporting bar or arm 11. This support is designated by the numeral 50, and is of such form as to normally hold the supporting bar or arm in its operative position and to permit the automatic returning of the arm to this position when the same has been swung rearwardly, by an obstruction or the like. This support 50 includes an arcuate depending horn 51, which gradually curves toward the head 35, and terminates in a lower supporting hook 52. The inner end of the horn 50 supports a depending hook 53, which forms a seat for the inner end of the supporting bar or arm 11 when the same is in its normal position. The horn 51 is connected to a socket 54, which extends around the attaching bar or arm 10. This socket is connected to the bar or arm 10, by means of a bolt 55. The upper surface of the horn 51 inwardly of the hook 53, is provided with a rest 56 for the supporting arm or rod 11, when the same is swung rearwardly, on top of the harvester to its inoperative position. It is desirable and preferable that the horn 51 and the socket 54 be cast out of one piece. The means of pivoting the supporting arm 11 to the attaching arm 10 permits the head and arm to be swung backward upon the bolt 28, should an obstruction be met with, such as a stump, post or the like, while the binder is in operation. The formation of the horn 51, when returning the arm to its normal position tends to lift the arm and head 35 upwards and thus over the obstruction.

In use, the attachment is connected to the binder, so that the outer curved arcuate ends of the rods or fingers 36 will curve over the outer ends of the bundle carrier B as clearly shown in Figure 1 of the drawings, and after the first bundle has been deposited upon the carrier structure from the deck A, the same will be forced outwardly by subsequent bundles until it is engaged by the arcuate portion 45 of the rods or fingers 36. These rods will prevent the bundle from being dropped from the carrier B, and will also form an abutment against which other bundles may be forced, upon the depositing of subsequent bundles upon the carrier, permitting the carrier to retain a greater number of bundles thereon than could be otherwise retained on such a carrier. The fingers 36 also prevent the accidental deposit of any bundles from the carrier on the ground, thus insuring all of the bundles being deposited in the proper and desired place. When it is desired to swing the attachment over the binder to its inoperative position when the binder is not in operation, it is merely necessary to swing the bar 11 on the pivot bolt 30 and position the same in the rest 56 as shown in dotted lines in Figure 6. It can be seen that when an obstruction is met with and the rod 11 is swung on the pivot 28, the rod will ride down the inclined surface of the horn 51 and the fingers will be automatically lifted over the obstruction. As soon as the obstruction has been passed, the weight of the outer end of the bar and head 35 will urge the inner end of the bar 11 against the curved surface of the horn 51 and thus return the bar to its normal position. The hook 52 forms a retaining means for the bar 11 and prevents a too far swinging movement thereof. The various positions of the rod are shown in dotted lines in Figure 6 of the drawings, during the swinging movement of the rod.

In Figures 8 and 9 is illustrated a slightly modified form of this attachment, which is adapted to be used in connection with a conventional form of binders having laterally extending bundle carriers. In this form the bundle carrier for the harvester is designated by the letter F, and includes the usual fingers or tines 60 and the side bars 61 and 62. The attachment in this form is constructed exactly like the attachment illustrated in Figures 1 to 7 inclusive, with the exception that different forms of bundle engaging fingers are provided. In this form the fingers are designated by the numerals 63 and 64. As shown, the bundle fingers 63 curve downwardly and hook over the side bars 62 as at 65. The fingers 63 curve forwardly over the outer end of the carrier and prevent the accidental discharge of the sheaves over the outer end thereof and the engagement of these fingers with the guard 62 forms an abutment which prevents the fingers from swinging back and the consequent forcing of the sheaves over the guard 62. The fingers 64 curve arcuately and downwardly of the carrier and form a basket in connection with the carrier and prevent the sheaves from being forced off of the same.

It is apparent that the improved attachment can be readily used, in connection with grain which is being tied in bundles, or with the harvesting of flax, in which the straw is left loose.

Changes in details may be made without departing from the spirit or scope of this invention; but,

We claim:

1. The combination with an ordinary self binding harvester including a bundle carrier, of a bundle carrier attachment positioned over and extending laterally of the outer end of the bundle carrier to retain bundles thereon including an attaching bar and a supporting bar, means for pivotally connecting the supporting bar to the attaching bar to permit the same to be moved in a vertical and horizontal plane, and resilient fingers carried by the outer end of said supporting bar.

2. The combination with an ordinary self binding harvester including a bundle carrier, of a bundle carrier attachment positioned over and extending outwardly of the outer end of the bundle carrier to retain bundles thereon including an attaching arm, means rigidly securing the attaching arm to the binder, an outwardly extending supporting arm, means pivotally securing the arm intermediate its ends to the attaching arm, a head carried by the outer end of said supporting arm, a plurality of bundle engaging fingers carried by the head, and means engaging said supporting arm to normally hold the same in its normal position.

3. The combination with an ordinary self binding harvester including a bundle carrier, of an attachment therefor comprising an attaching and supporting arm formed of tubing, means connecting the attaching arm to said binder, a casting connecting the arms together for permitting the supporting arm to be swung in a horizontal plane, a horn carried by the outer end of the attaching arm for permitting the supporting arm to be held in its normal operative position and in its inoperative position over said binder.

4. The combination with an ordinary self binding harvester including a bundle carrier, of an attachment for the harvester comprising an attaching bar, an angularly extending supporting bar, means pivotally securing the supporting bar intermediate its ends to the attaching bar for movement about a horizontal and a vertical axis, a pivoted head carried by the outer end of said supporting bar, a plurality of radially extending resilient fingers carried by the head, and a supporting arm for normally holding the supporting bar in its normal position and engaging said supporting arm throughout its movement about the said horizontal and vertical axes.

5. The combination with an ordinary self binding harvester including a bundle carrier, of an attachment for the harvester comprising an attaching arm, clamps for securing the arm in position on the harvester, an angularly extending supporting arm, means pivotally securing the supporting arm to the attaching arm, a plurality of rearwardly extending grain engaging fingers carried by the supporting arm, and an outwardly and downwardly curved horn carried by the attaching arm for normally holding the supporting arm in its operative position and for returning the supporting arm to its operative position when the same has been swung out of its operative position.

6. The combination with an ordinary self binding harvester including a bundle carrier, of an attachment for the harvester comprising an attaching arm, clamps for securing the arm in position on the harvester, an angularly extending supporting arm, means pivotally securing the supporting arm to the attaching arm, a plurality of rearwardly extending grain engaging fingers carried by the supporting arm, and an outwardly and downwardly curved horn carried by the attaching rod for normally holding the supporting arm in its operative position, and for returning the supporting arm to its operative position when the same has been swung out of its operative position, and rest hooks carried by the terminals of said horn.

7. The combination with an ordinary self binding harvester including a bundle carrier, of an attachment for the harvester comprising an attaching arm, clamps for securing the arm in position on the harvester, an angularly extending supporting arm, means pivotally securing the supporting arm to the attaching arm, a plurality of rearwardly extending grain engaging fingers carried by the supporting arm, and an outwardly and downwardly curved horn carried by the attaching arm for normally holding the supporting arm in its operative position, and to return the supporting arm to its operative position when the same has been swung out of its operative position, rest hooks carried by the terminals of said horn, and a supporting arm rest formed on the upper surface of the horn for receiving the supporting arm when the attachment is swung to its inoperative position over the harvester.

8. The combination with an ordinary self binding harvester including a bundle carrier, of an attachment therefor comprising an attaching arm, an angularly extending supporting arm, a casting for connecting the arms together including a base plate, laterally extending pivot ears carried by the base plate arranged to embrace the attaching arm, a pivot pin extending through said ears and said attaching arm, the base plate having a plurality of pivot openings formed therein, a pivot bolt extending through the supporting arm and through one of said pivot openings and arranged at right angles to the first mentioned pivot bolt, and a plurality of radially extending resilient fingers carried by the supporting arm.

9. In an attachment for harvesters, a supporting arm, a head pivotally carried by the outer end of the supporting arm including upper and lower castings having grooves formed in their meeting faces, and outwardly extending arcuate resilient fingers fitted in said grooves and arranged between said castings.

10. In an attachment for self binding harvesters, a supporting arm, a head carried by the outer end of the supporting arm including a pair of disc shaped castings having axial openings formed therein, a pivot bolt extending through said axial openings and the arm, the inner meeting faces of said castings having a plurality of radially extending grooves formed therein, pairs of arms arranged in said grooves, the pairs of arms being connected together by U-shaped bight portions.

11. In an attachment for harvesters, an attaching arm, a supporting rod, means pivotally connecting the arms together, a rest horn secured to the attaching arm and curving outwardly downwardly and then forwardly therefrom, hooks formed on the terminals of the horn, and a rest formed on the upper surface of the horn arranged in parallel relation to the attaching arm.

PAUL GERLACH.
THOMAS CUFF.